(12) United States Patent
Muday et al.

(10) Patent No.: US 6,990,762 B1
(45) Date of Patent: Jan. 31, 2006

(54) PET AMUSEMENT DEVICE

(76) Inventors: Thomas P. Muday, 8321 E. Evans, Scottsdale, AZ (US) 85260; Christopher M. Buttenob, 8321 E. Evans, Scottsdale, AZ (US) 85260

( * ) Notice: Subject to any disclaimer, the term of this patent is extended or adjusted under 35 U.S.C. 154(b) by 0 days.

(21) Appl. No.: 10/764,063

(22) Filed: Jan. 23, 2004

(51) Int. Cl.
*G09F 19/00* (2006.01)

(52) U.S. Cl. ............................ 40/409; 40/406; 119/707
(58) Field of Classification Search ................. 40/409, 40/406, 427; 119/707
See application file for complete search history.

(56) References Cited

U.S. PATENT DOCUMENTS

| | | | |
|---|---|---|---|
| 1,350,542 A | 8/1920 | Booth | |
| 1,824,388 A * | 9/1931 | Birch | ........................ 40/439 |
| 3,699,913 A | 10/1972 | Sautbine | |
| 3,905,140 A | 9/1975 | Damiano | |
| 4,215,500 A | 8/1980 | Sharp | |
| 4,641,445 A | 2/1987 | Rossi | |
| 4,757,625 A * | 7/1988 | Watkins | ........................ 40/406 |
| 4,817,311 A | 4/1989 | Ong | |
| 4,928,412 A | 5/1990 | Nishiyama | |
| 4,993,986 A | 2/1991 | Bloomfield | |
| 5,291,674 A | 3/1994 | Torrence | |
| 5,502,908 A | 4/1996 | Powell et al. | |
| 5,919,078 A | 7/1999 | Cassidy | |
| 6,382,808 B1 * | 5/2002 | Lin | ........................ 362/96 |

* cited by examiner

Primary Examiner—Gary C. Hoge
(74) Attorney, Agent, or Firm—Gregory J. Nelson

(57) ABSTRACT

An amusement and entertainment device for pets, particularly felines. The device has a weighted base with a curved outer surface. A fan within the base directs a flow of air into a transparent viewing chamber which contains one or more flying particles which have the appearance of flying insects will dart and fly about in the chamber. The particles may be luminescent to glow in the dark. The device will appeal to the animal's stalking instincts and will return to an upright position when pawed or struck.

7 Claims, 2 Drawing Sheets

PET AMUSEMENT DEVICE

FIELD OF THE INVENTION

The present invention relates to an amusement device and more particularly to a device for creating visual effects to entertain and amuse pets, particularly felines.

BACKGROUND OF THE INVENTION

Domestic animals such as cats, kittens and puppies are generally playful and will be attracted to items which can be batted about and which move in response to the animals activity and which also provide visual stimulation. Accordingly, conventional toys for these types of animals include different types of rubber balls, plush toys, rubber animals having the appearance of a creature such as a mouse. In many cases, these toys include components that provide a visual stimulation or emit an aroma to enhance the attraction. However these conventional pet toys do not often hold the attention of the animal and the animal loses interest in a short period of time. Further, conventional animal amusement devices do not appeal to the animal's natural stalking and hunting instincts. If an animal, such as a feline, becomes disinterested in a play toy, often the animal will turn its energies into behavior which is not acceptable to the pet owner and may be destructive to personal and household items.

Accordingly, there exits a need for a play toy for animals, particularly felines, which will maintain the interest of the animal for long periods of time and which will appeal to the animal's natural instincts to stalk, hunt and encourage the animal to use its paws and engage the animal's energies for long periods of time.

BRIEF SUMMARY OF THE INVENTION

Briefly, the present invention provides an animal play toy having a lower base which houses a battery switch, motor and a horizontally disposed fan. The lower base has a generally semi-circular molded plastic shell and is heavily weighted. An upper base portion rests on a lower base and is also molded plastic and has a plurality of circumferentially extending vents. A generally cylindrical, transparent housing is secured to the upper base. The top of the housing or container is enclosed by a cap which defines a plurality of vents. The housing and cap enclose a viewing chamber. Inlets in the upper base allow air to be directed by the fan into the container chamber through slots or vents in the upper base of the container. Air flows through the container imparting a swirling, flying motion to decorative particles inside the container. Preferably the particles are a light weight plastic or coated paper and are configured to resemble flying insects such as small moths or butterflies. The particles may be coated or decorated with luminous paint so that when they are exposed to incandescent light, they will subsequently appear to glow when the device is activated in a dark environment. The flying particles within the container will create an amusing, attractive visual effect which will entertain and entice the animal for long play periods.

BRIEF DESCRIPTION OF THE DRAWINGS

The above and other advantages and objects of the present invention will become more readily apparent from the following description, claims and drawings in which:

DETAILED DESCRIPTION OF THE DRAWINGS

Figure 1:
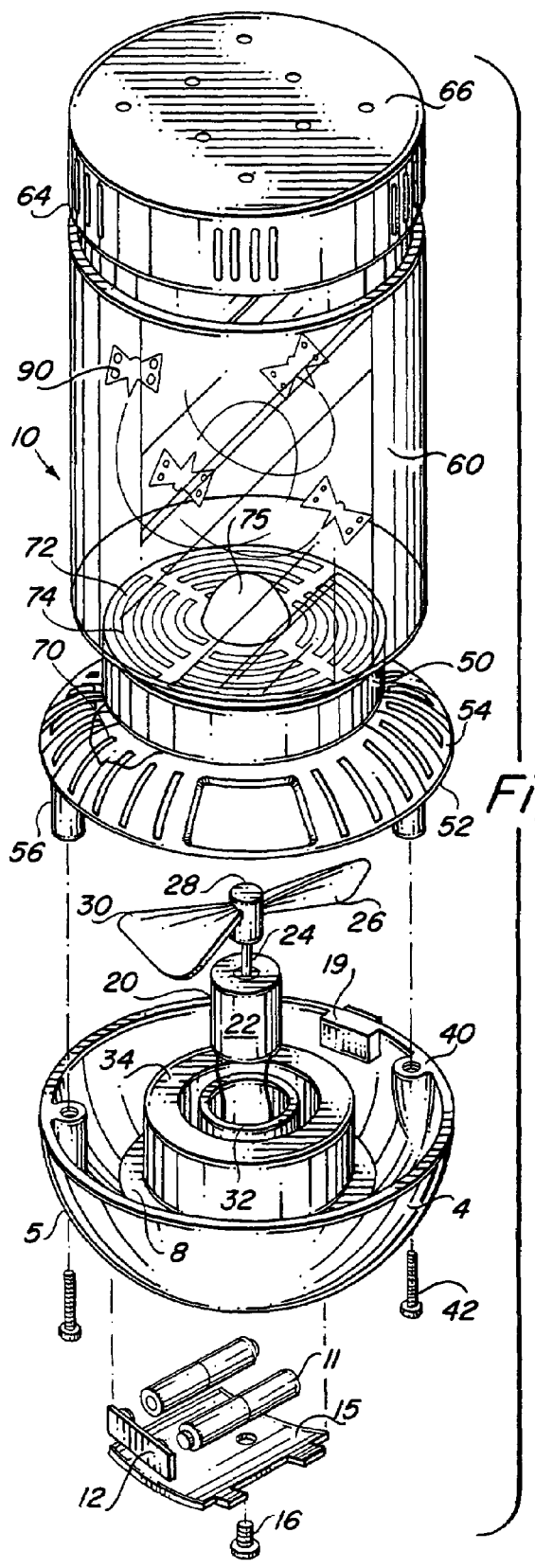
FIG. 1 is an exploded, perspective view of the animal amusement device of the present invention.
Figure 2:
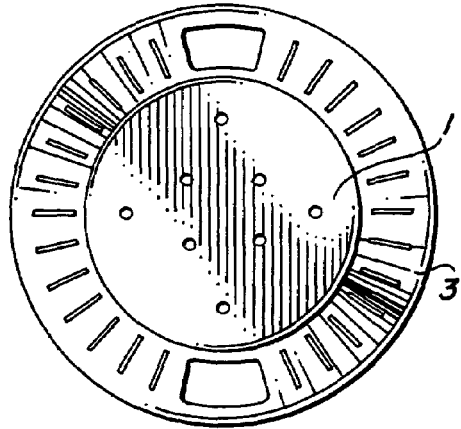
FIG. 2 is a bottom view of the device.
Figure 3:
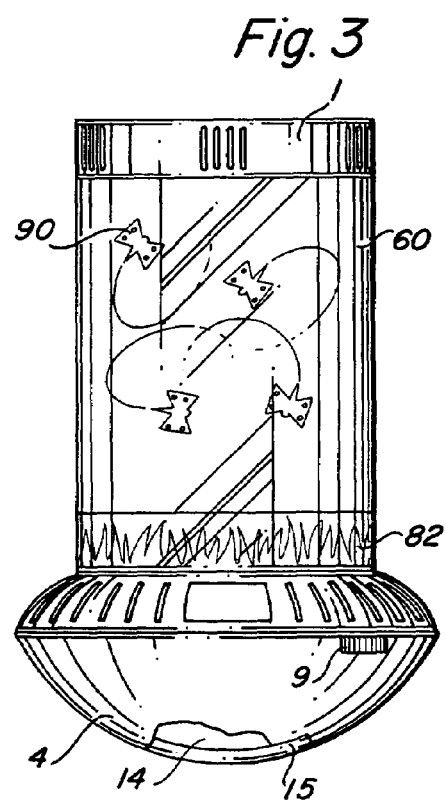
FIG. 3 is a side view of the device with the flying particles airborne.

Turning now to the drawings, the pet amusement device 10 of the present invention has a base 4 which is shown as being generally hollow and having a semi-spherical, outer surface 5. The exterior surface 5 allows the device to freely rock when the device is hit or batted by an animal. The lower portion of the base defines a compartment 8 which receives two or more batteries 11 which are engaged with contact with plate 12 when inserted. The batteries are maintained in the battery compartment 14 by a battery door 15 which is secured by a fastener. The batteries are connected to small motor 8 across a switch 19 having an on-off slide. The battery circuitry is conventional.

The conductors within the circuit connect to the motor 20. The motor 20 is shown as having a generally cylindrical housing 22 with a vertically extending shaft 24. A fan 26 has a central hub 28 which is secured to the upper end of the motor shaft. A pair of fan blades 30 extend oppositely from the hub and are configured to direct an air flow upwardly in a generally swirling path as will be explained hereafter. The fan blades may be a molded plastic or may be a flexible material. The motor housing 22 seats in a circular sleeve 32 concentric within the hollow base. An annular weight 34 extends around the motor and the motor housing. The weight 34 may be any suitable material such as a metal and is provided to add weight to the lower end of the device to assist in self-righting the device and returning it to an upright position once it is batted or struck by the paw of an animal. The batteries, being disposed in the lower most part of the lower base, will also add weight and assist in the self-righting of the device.

A pair of vertical bosses 40 are disposed within the interior of the base and define bores which receive threaded fasteners 42 shown as small screws. The screws secure the lower base to the upper base 50. The upper base 50 has an annular flange 52 which curves downwardly and may be provided with one or more vents 54 as shown. The peripheral edge of the upper base rests on the upper surface of the lower base 5. A plurality of bosses 56 depend from the interior surface of the upper base and are positioned to align with the bosses 40 in the lower base. The bosses in the upper base receive fasteners 42 to secure the upper and lower bases together.

A housing 60 has a transparent, cylindrical wall 62 which is enclosed at the upper end by a cap or lid 64 when provided with exhaust vents 66 which may be provided both in the planar upper surface and the depending sidewall of the lid. The lower end of the housing is secured to the upper base. The lower end of the upper base has an annular flange 70 which seats against the interior of the lower base at the central opening in the upper base. A floor 72 extends across the lower end of the housing and is provided with a plurality of apertures 74 which are shown as arcuate slots but may also be perforations. The center of the floor supports a small upwardly projecting dome 75 which will assist in directing the air flow in a swirling, circular path within the viewing chamber 80 within the housing. In order to provide realism and interest, a band of graphics 82 may be applied along the lower end of the housing. As for example, the graphics may depict a natural scene such as grass and soil. Further, the floor 72 within the housing and the dome may also be colored to give the further appearance of a natural scene.

Located within the chamber are one or more flying objects or particles 90. Each of the objects or particles is a light weight material such as paper or a light weight plastic such as a polyester. Preferably the flying particles are in the shape of insects such as moths, butterflies and similar flying insects each having a body and wings. The body and wings of the flying objects preferably carry a design using a luminescent glow-in-the-dark paint or coating. In this way, when the particles 90 are exposed to incandescent light for a period of time and the device is subsequently used in the dark, the particles will glow in the dark to attract the interest of the animal. Preferably the entire device is molded from a durable plastic material such as polystyrene, as by injection molding. The upper and lower bases and lid may be provided in any suitable color. The housing is transparent and typical materials would be acrylics and polystyrene.

Figure 4:
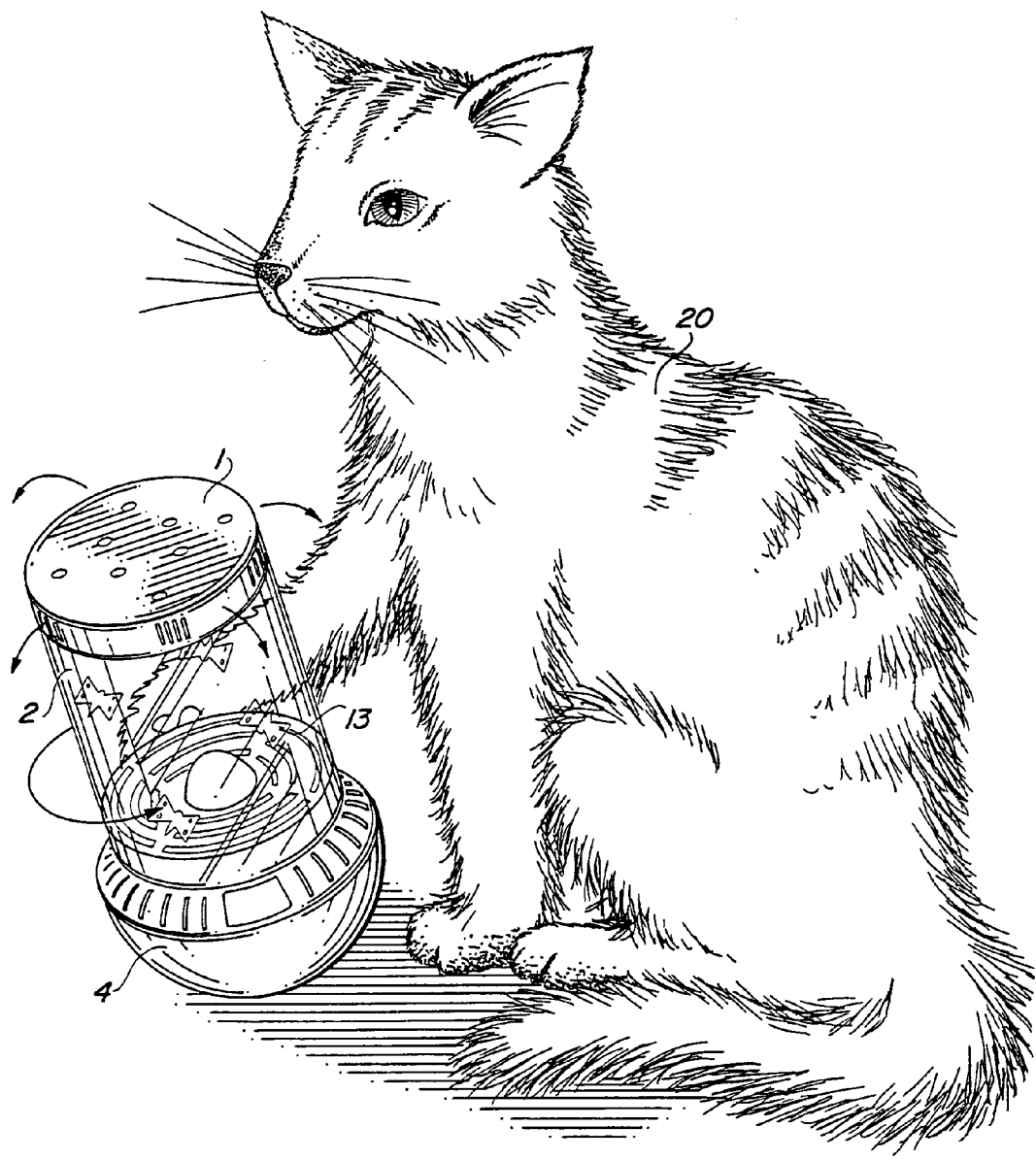
FIG. 4 shows a feline playing with the device of the present invention.

In use, batteries 11 would be inserted into the battery compartment 14 once the battery cover 15 is removed. Once the batteries are in place, the cover is secured by fastener 16. Preferably the fasteners 15 and 42 utilized to secure the battery cover and secure the upper and lower base are recessed so as not to provide any projections. The switch 19, when activated, will energize the motor 8 completing a circuit via conductors 21. The fan will rotate directing an air flow upwardly through the vents 74 in the floor 72 of the viewing chamber within the housing. The upward, circular air flow will impart a realistic flying motion to the particles having the appearance of insects such as moths. The flying particles will swirl about within the chamber and will land and resume flying in a manner closely similar to that of live insects. When the device is activated and placed before an animal, such as a feline as shown in FIG. 4, the natural stalking and hunting instincts of the animal will cause the animal to be immediately attracted to the device. The animal will strike or bat the device with its paws or but the device with its nose in an attempt to "catch" the flying particles. As seen in FIG. 4, the device will tilt and rotate when batted or struck but will return to the upright position due to the weighted lower base. The device will provide long periods of amusement and attraction for animals.

As indicated above, the device can also be used in the dark. The user will first expose the device to bright, incandescent lights which energy will cause the luminescent surfaces on the insects to glow in the dark. Thus, if the animal is nocturnal, the device can be also used in dark environments to entertain and occupy the attention of an animal.

It will be obvious to those skilled in the art to make various changes, alterations and modifications to the invention described herein. To the extent such changes, alterations and modifications do not depart from the spirit and scope of the appended claims, they are intended to be encompassed therein.

We claim:

1. A pet amusement device comprising:
   (a) a base having a top and a generally semi-circular exterior bottom surface, said base defining a compartment having air inlets;
   (b) weight means in said base compartment for returning said device to an upright position when struck;
   (c) a motor, fan and battery compartment in said base compartment, said fan having a blade for directing air flow upwardly;
   (d) a base plate defining apertures extending across the top of said base;
   (e) a housing having a transparent side wall and a top wall and defining a viewing chamber, said housing being vented; and
   (f) light weight particles in said viewing chamber, which particles become airborne in said air flow path.

2. The amusement device of claim 1 wherein said particles have the appearance of insects.

3. The amusement device of claim 1 wherein said particles are luminous.

4. The amusement device of claim 1 wherein one of said housing and base is provided with graphics having the appearance of an outdoor scene.

5. The amusement device of claim 1 wherein said base and housing are molded plastic.

6. The pet amusement device of claim 1 wherein said baseplate has a central dome for imparting a swirling air flow in said viewing chamber.

7. The pet amusement device of claim 1 wherein said weight means comprises a sleeve centrally located in said base compartment and said motor is housed in said sleeve.

* * * * *